A. H. KNIGHT.
MOTOR VEHICLE.
APPLICATION FILED JULY 22, 1910.

1,052,485.

Patented Feb. 11, 1913.

Witnesses
J. H. Bruninga.
C. J. Brown.

Inventor
Alfred H. Knight
By Foster Freeman Watson Kent
Attorneys

UNITED STATES PATENT OFFICE.

ALFRED H. KNIGHT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,052,485.      Specification of Letters Patent.      Patented Feb. 11, 1913.

Application filed July 22, 1910. Serial No. 573,343.

*To all whom it may concern:*

Be it known that I, ALFRED H. KNIGHT, a citizen of the United States, and resident of Detroit, county of Wayne, State of Michigan, have invented certain new and useful Improvements in Motor-Vehicles, of which the following is a specification.

This invention relates to motor vehicles and particularly to the chassis and body construction, and more particularly to that type in which the body is detachable from the chassis.

In detachable body construction as now used, the sill of the body extends forwardly to a point adjacent the dash, so that the front of the sill abuts against the dash. While this is satisfactory in those constructions in which the body between the front seat and dash is open, it is not satisfactory where bodies are housed in and provided with doors between the front seat and the dash, for in such a case it is necessary to provide a joint between the dash and the body.

One of the objects of this invention therefore is to construct a detachable body so that a joint is provided between the dash and the forward part of the body, and to conceal this joint so that it is not exposed.

Further objects will appear from the detail description, taken in connection with the accompanying drawings, in which—

Figure 1:
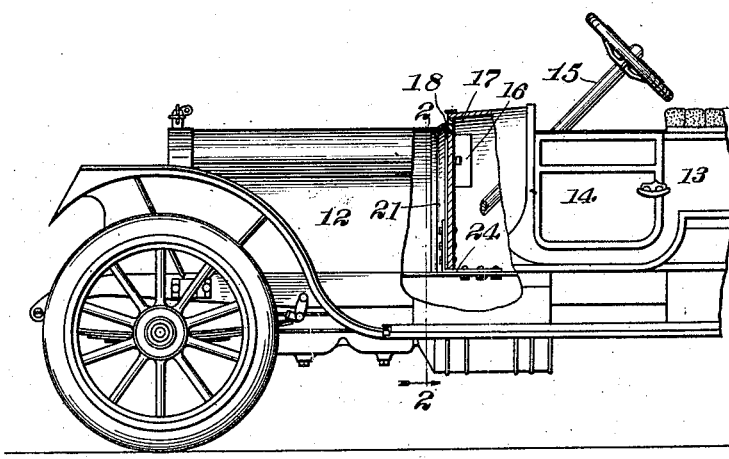
Figure 2:
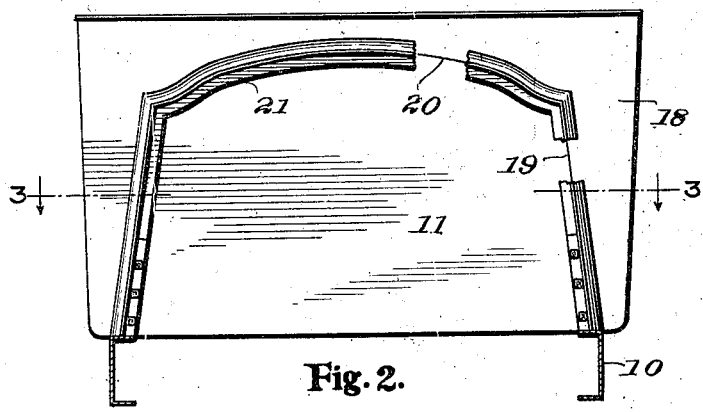
Figure 3:
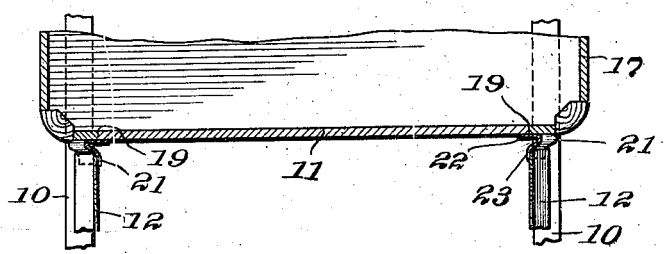

Figure 1 is a side elevation and part section, showing a part of a motor vehicle embodying this invention; Fig. 2 is a section on the line 2—2, Fig. 1, looking rearwardly, the bonnet being removed; and Fig. 3 is a section on the line 3—3, Fig. 2, looking in the direction of the arrow, Fig. 2.

Referring to the drawings, the side bars of the frame or chassis are indicated by the reference character 10, 11 designates the dash, 12 the motor bonnet or hood, 13 the body which extends forwardly of the front seat and is provided with a swinging fore door 14, between the dash and the front seat, 15 the steering post, and 16 the coil box mounted upon the dash. The dash is cut down to conform to the shape of the bonnet, and the forward portion 17 of the body, which is provided with the front portion 18, is cut to conform to the dash so as to extend around and over its side and top edges and make joints 19, 20 therewith. A molding 21 preferably of sheet metal is mounted at the forward side of the dash and is provided with a flange portion 22, which extends over and around and conceals the joint 19, and with a forwardly projecting portion 23 which forms a ledge or support for the bonnet. This molding is secured in position by means of bolts passing through upper limbs of brackets 24 secured to the side members 10. The bolts pass through the brackets, the molding, and the dash, so as to securely clamp the molding between the brackets and dash, and to the dash, and so as to clamp both the molding and dash to the chassis.

It will thus be seen that this invention provides a very strong and neat construction. The outline of the dash conforms to the bonnet, and the molding 21 conceals the joint between the dash and body. This molding also forms a ledge or support for the bonnet.

It is obvious that various changes may be made in the details of construction, without departing from this invention, and it is, therefore, to be understood that this invention is not to be limited to the specific construction shown and described.

Having thus described the invention, what is claimed is:

1. In a motor vehicle, the combination with a chassis including a frame, a dash secured on the frame, and a motor bonnet, of a detachable body for the chassis including a forward portion making a joint with the dash, and a molding or ledge covering said joint and forming a support for said bonnet.

2. In a motor vehicle, the combination with a chassis including a frame, a dash and a motor bonnet, of a detachable body having a forward portion extending along the top and side edges of the dash and making a joint therewith, and a molding covering said joint and forming a ledge or support for the bonnet.

3. In a motor vehicle, the combination with a frame and a dash secured thereto, of a bonnet ledge conforming to the outlines of the dash and secured thereto so that it projects beyond the edges of the dash, and a detachable body having a forward portion making a joint with the edges of the dash, whereby the bonnet ledge covers the joint.

4. In a motor vehicle, the combination with the side members of the chassis frame and the motor bonnet, of brackets secured to said side members, a dash secured to said brackets, a ledge for the motor bonnet arranged on the front of the dash and projecting beyond the top and sides of the dash, and a detachable body having a forward portion making a joint with the sides and top of the dash, and said bonnet ledge covering and concealing said joint.

5. In a motor vehicle, the combination with a chassis including a frame, a dash, and a motor bonnet conforming to the outlines of the dash, of a detachable body having a forward portion extending along the edges of the dash, and a molding conforming to the bonnet lines connected to the dash but not connected to the body and arranged to conceal the joint between the dash and body.

6. In a motor vehicle, the combination with a chassis including a frame, a dash, and a motor bonnet conforming to the outlines of the dash, of a detachable body having a forward portion extending along the edges of the dash, and a molding connected to the dash but not connected to the body and conforming to the lines of the dash, the bonnet and the body.

In testimony whereof I affix my signature in presence of two witnesses.

ALFRED H. KNIGHT.

Witnesses:
W. H. FINCKEL, Jr.,
C. I. DALE.

---

Copies of this patent may be obtained for five cents each, by addressing the "Commissioner of Patents, Washington, D. C."